(12) United States Patent
Hayashida et al.

(10) Patent No.: US 10,599,235 B2
(45) Date of Patent: Mar. 24, 2020

(54) TACTILE INPUT DEVICE THAT REDUCES AREA OCCUPIED UNDER TOP SURFACE

(71) Applicant: GOOGLE LLC, Mountain View, CA (US)

(72) Inventors: Jeffrey Hayashida, San Francisco, CA (US); Joshua Boilard, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 35 days.

(21) Appl. No.: 15/729,544

(22) Filed: Oct. 10, 2017

(65) Prior Publication Data

US 2018/0101252 A1    Apr. 12, 2018

Related U.S. Application Data

(60) Provisional application No. 62/406,658, filed on Oct. 11, 2016.

(51) Int. Cl.
| | | |
|---|---|---|
| *G06F 3/0354* | (2013.01) | |
| *G06F 3/044* | (2006.01) | |
| *G06F 3/02* | (2006.01) | |
| *G06F 1/16* | (2006.01) | |
| *G06F 3/041* | (2006.01) | |

(52) U.S. Cl.
CPC .......... *G06F 3/03547* (2013.01); *G06F 1/169* (2013.01); *G06F 1/1616* (2013.01); *G06F 1/1637* (2013.01); *G06F 1/1662* (2013.01); *G06F 3/0202* (2013.01); *G06F 3/044* (2013.01); *G06F 3/0416* (2013.01)

(58) Field of Classification Search
CPC .... G06F 1/1616; G06F 1/1637; G06F 1/1662; G06F 1/169; G06F 3/03547; G06F 3/044; G06F 3/0202; G06F 3/0416
See application file for complete search history.

(56) References Cited

U.S. PATENT DOCUMENTS

| | | | |
|---|---|---|---|
| 6,096,984 A | 8/2000 | Howell et al. | |
| 2010/0103129 A1* | 4/2010 | Ling | G06F 1/1616 345/173 |

(Continued)

FOREIGN PATENT DOCUMENTS

| | | | |
|---|---|---|---|
| CN | 1635442 A | * | 7/2005 |
| CN | 1635442 A | | 7/2005 |

(Continued)

OTHER PUBLICATIONS

International Search Report and Written Opinion for International Application No. PCT/US2017/056128, dated Mar. 8, 2018, 10 pages.

*Primary Examiner* — Amare Mengistu
*Assistant Examiner* — Jennifer L Zubajlo
(74) *Attorney, Agent, or Firm* — Brake Hughes Bellermann LLP

(57) ABSTRACT

A tactile input device may include a top surface, a sensor beneath the top surface, a controller beneath the top surface, and a securement mechanism. The controller may be configured to process input received by the sensor. The securement mechanism may be configured to secure the tactile input device to a portable computing device. The sensor, the controller, and the securement mechanism may all be superposed by the top surface.

18 Claims, 13 Drawing Sheets

(56) References Cited

U.S. PATENT DOCUMENTS

| | | | |
|---|---|---|---|
| 2011/0050581 A1* | 3/2011 | Steenfeldt Berg | G06F 1/169 345/168 |
| 2014/0098046 A1* | 4/2014 | Tenuta | G08B 6/00 345/173 |
| 2015/0268780 A1* | 9/2015 | Kim | G06F 3/0412 345/174 |
| 2015/0268827 A1* | 9/2015 | Kim | G06F 3/04842 715/846 |
| 2016/0162030 A1 | 6/2016 | Patel et al. | |
| 2016/0259411 A1 | 9/2016 | Yoneoka et al. | |

FOREIGN PATENT DOCUMENTS

| | | |
|---|---|---|
| CN | 201820210 U | 5/2011 |
| CN | 104063015 A | 9/2014 |

\* cited by examiner

TACTILE INPUT DEVICE THAT REDUCES AREA OCCUPIED UNDER TOP SURFACE

CROSS REFERENCE TO RELATED APPLICATION

This application claims priority to U.S. Provisional Application No. 62/406,658, filed Oct. 11, 2016, the disclosure of which is incorporated by reference herein in its entirety.

TECHNICAL FIELD

This description relates to tactile input devices of computing systems.

BACKGROUND

Tactile input devices may be included in portable computing devices to receive directional input from a user. An ease of providing input into the tactile input device may be related to a size of a top surface of the tactile input device.

SUMMARY

According to an example, a tactile input device may include a top surface, a sensor beneath the top surface, a controller beneath the top surface, and a securement mechanism. The controller may be configured to process input received by the sensor. The securement mechanism may be configured to secure the tactile input device to a portable computing device. The sensor, the controller, and the securement mechanism may all be superposed by the top surface.

According to an example, a portable computing device may include at least one processor, a chassis enclosing the at least one processor, a keyboard, and a tactile input device. The chassis may define a keyboard aperture and a tactile input device aperture. The keyboard may be disposed in the keyboard aperture. The keyboard may include multiple keys and may be coupled to the at least one processor. The tactile input device may be disposed in the tactile input device aperture. The tactile input device may be coupled to the at least one processor. A distance from a back end of the tactile input device to a key of the multiple keys that is closest to the tactile input device may be less than one-tenth of a length of the tactile input device. The back end of the tactile input device may be an end of the tactile input device that is closest to the keyboard. The length of the tactile input device may be a distance from the back end of the tactile input device to an opposing front end of the tactile input device.

According to an example, a portable computing device may include at least one processor, a chassis enclosing the at least one processor, a keyboard, and a tactile input device. The chassis may define a keyboard aperture and a tactile input device aperture. The keyboard may be disposed in the keyboard aperture. The keyboard may include multiple keys and may be coupled to the at least one processor. The tactile input device may be disposed in the tactile input device aperture. The tactile input device may be coupled to the at least one processor. A distance from a front end of the tactile input device to a front end of the portable computing device may be less than one-twentieth of a length of the tactile input device. The front end of the tactile input device may be an end of the tactile input device that is distal from the keyboard. The front end of the portable computing device may be an end of the portable computing device that is adjacent to the front end of the tactile input device. The length of the tactile input device may be a distance from the front end of the tactile input device to a back end of the tactile input device. The back end of the tactile input device may be an end of the tactile input device that is adjacent to the keyboard.

According to an example, a method of manufacturing a portable computing device may include enclosing at least one processor and at least one memory device with a chassis, inserting a keyboard into a keyboard aperture defined by a top portion of the chassis, and inserting a tactile input device into a tactile input device aperture defined by the top portion of the chassis without the tactile input device passing through a plane extending along a bottom portion of the chassis. The bottom portion of the chassis may be opposite from the top portion of the chassis. The plane may be parallel to a top surface of the tactile input device.

The details of one or more implementations are set forth in the accompanying drawings and the description below. Other features will be apparent from the description and drawings, and from the claims.

DETAILED DESCRIPTION

A tactile input device described herein may maximize a surface area of a top surface of the tactile input device onto which the user may provide touch input. The tactile input device may maximize the surface area of the top surface by reducing an area occupied by components under the top surface, such as attachment mechanisms. Some or all attachment mechanisms of the tactile input device, which attach or secure the tactile input device to a chassis of a portable computing device of which the tactile input device is a component, may be located underneath the top surface, and/or the top surface may superpose some or all of the attachment mechanisms of the tactile input device.

The reduction of area of occupied by components of the tactile input device, such as the attachment mechanisms, may enable the top surface to extend very close to a keyboard of the portable computing device and to a front end of the portable computing device, such as to within one-tenth of a length of the tactile input device to the keyboard and to within one-twentieth of the length of the tactile input device to the front end of the portable computing device. The close extension of the top surface to the keyboard and the front end may increase the size of the top surface of the tactile input device, improving the user experience. The tactile input device may be installed into the portable computing device from a top side of the portable computing device. A standalone tactile input device, which communicates with a computing device via a wired or wireless interface, may also include attachment mechanisms that are superposed by the top surface of the tactile input device as described herein.

Figure 1:
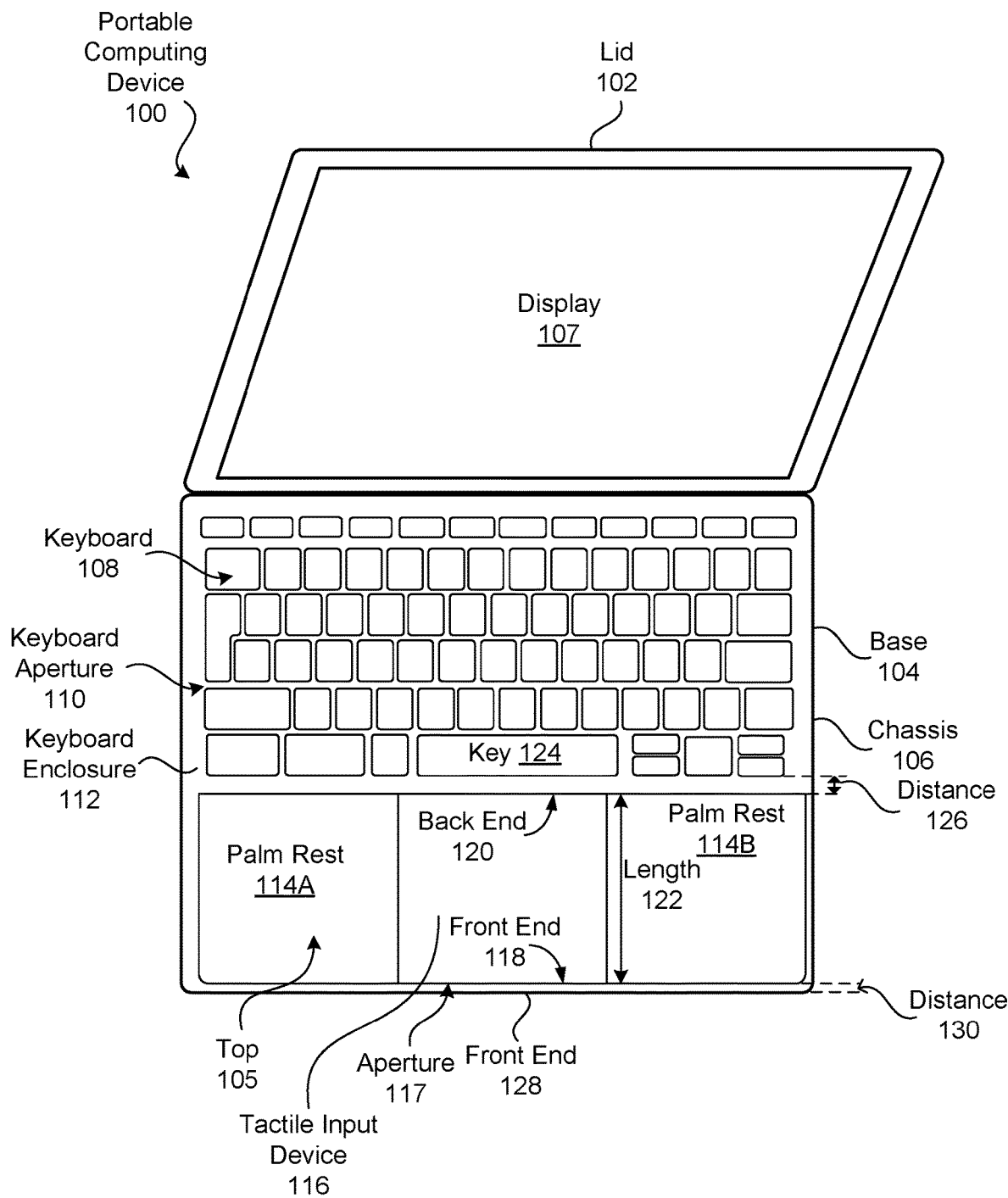
FIG. 1 is a perspective view of a portable computing device with a tactile input device according to an example embodiment.

FIG. 1 is a perspective view of a portable computing device 100 with a tactile input device 116 according to an example embodiment. The portable computing device 100 may include a lid 102 rotatably attached to a base 104. The lid 102 may include a display 107 that presents graphical output to a user of the portable computing device 100.

The base 104 may include a chassis 106. The chassis 106 may enclose components of the base 104, and/or serve as a point of attachment for components of the base 104. The chassis 106 may be made of a rigid material, such as plastic or metal such as aluminum. The chassis 106 may enclose at least one processor and at least one memory device (shown in FIG. 9). A keyboard enclosure 112 of the chassis 106 may define a keyboard aperture 110 that receives a keyboard 108. The keyboard 108 may include multiple keys for receiving alphanumeric and other character input from the user. The chassis 106 may also define a tactile input device aperture 117 for receiving a tactile input device 116. The chassis 106 may also include palm rest areas 114A, 114B to the left and right of the tactile input device aperture 117. The keyboard enclosure 112 and palm rest areas 114A, 114B may form a top 105 of the chassis 106, and the keyboard 108, keyboard enclosure 112, palm rest areas 114A, 114B, and tactile input device 116 may form a top of the base 104.

The tactile input device 116 may have a length 122 from a front end 118 of the tactile input device 116 to an opposing back end 120 of the tactile input device 116. The front end 118 and/or front end portion of the tactile input device 116 may be a portion or side of the tactile input device 116 that is closest to a front end 128 of the base 104. The front end 128 of the base 104 may be an end of the base 104 that is farthest from and/or opposite from an end of the base 104 where the lid 102 is rotatably attached to the base 104. The back end 120 and/or back end portion of the tactile input device 116 may be a portion or side of the tactile input device 116 that is closest to the keyboard 108 and/or is closest to a key 124 on the keyboard 108 that is closest to the tactile input device 116. In an example embodiment, a distance 126 from the back end 120 of the tactile input device 116 to the keyboard 108 and/or closest key 124 may be less than one-tenth of the length 122 of the tactile input device 116. In an example embodiment, a distance 130 from the front end 118 of the tactile input device 116 to the front end 128 of the base 104 may be less than one-twentieth of the length 122 of the tactile input device 116.

Figure 2A:
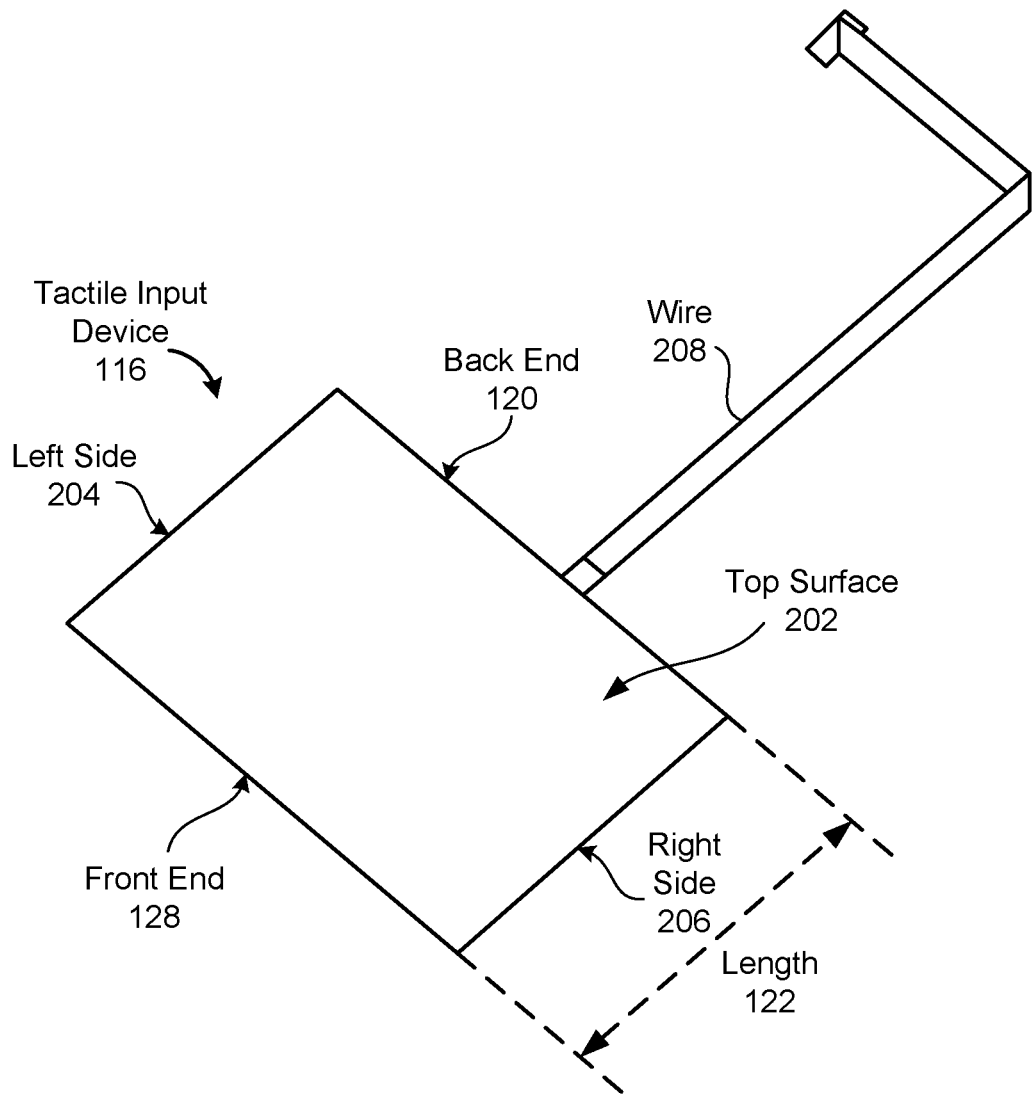
FIG. 2A is a top view of the tactile input device according to an example embodiment.

FIG. 2A is a top view of the tactile input device 116 according to an example embodiment. In this example, the back end 120, front end 128, left side 204, and right side 206 of a top surface 202 of the tactile input device 116 may form a rectangle with ninety-degree (90°) corners. FIG. 2A shows the length 122 of the tactile input device 116 from the back end 120 to the front end 128. A wire 208 may extend from a bottom 214 (shown in FIG. 2B) of the tactile input device 116 and carry signals and/or power to and/or from other components of the portable computing device 100, such as a motherboard, processor, and/or power source. The wire 208 may include one, at least one, and/or multiple metal wires and/or metal conduits for transmitting signals and/or power.

Figure 2B:
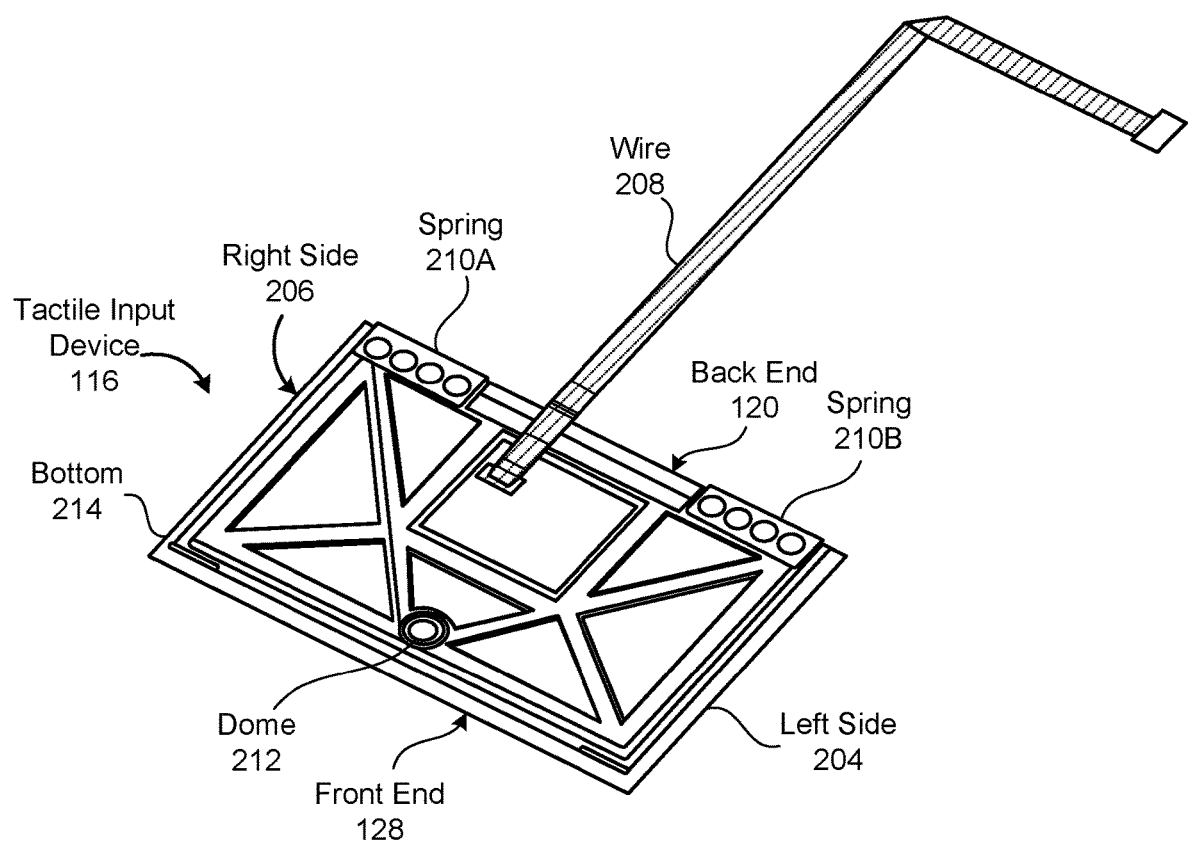
FIG. 2B is a bottom view of the tactile input device according to an example embodiment.

FIG. 2B is a bottom view of the tactile input device 116 according to an example embodiment. The wire 208 may be coupled to a controller 304 (shown in FIG. 3).

One or more, such as two, springs 210A, 210B may be attached to the tactile input device 116, and to the chassis 106 (not shown in FIG. 2A). The springs 210A, 210B may be biased to force the back end 120 of the tactile input device 116 away from the portable computing device 100. A user may press down on a surface of the tactile input device 116, overcoming the force, bias, and/or resistance of the springs 210A, 210B, causing the tactile input device 116 to move down toward the portable computing device 100. The movement of the tactile input device 116 down toward the portable computing device 100 may activate a dome switch 212.

The tactile input device 116 may include the dome switch 212 extending away from the bottom 214 of the tactile input device 116. The activation of the dome switch 212 by movement of the tactile input device 116 down toward the portable computing device 100, compressing the dome switch 212, may cause the tactile input device 116 to send a click signal or a press down signal to the processor, based upon which the processor and/or portable computing device 100 may recognize a click gesture or drag gesture, as non-limiting examples.

Figure 2C:
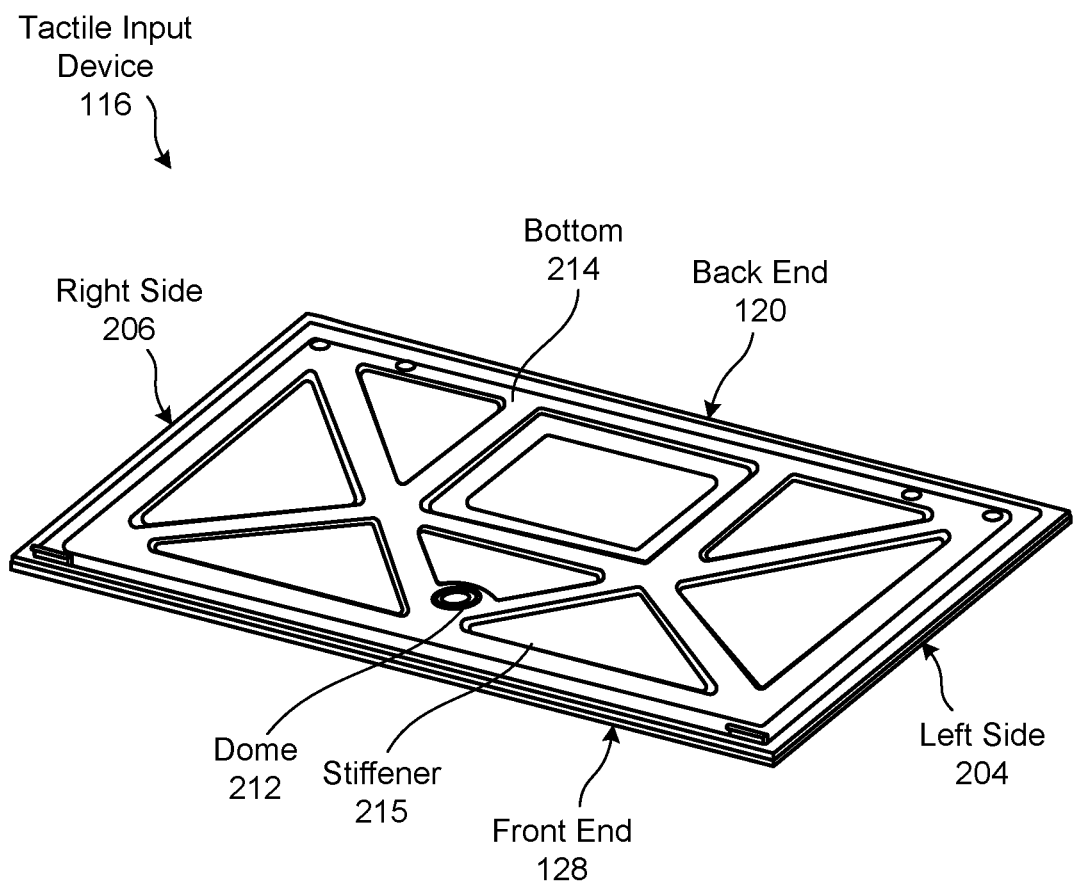
FIG. 2C is another bottom view of the tactile input device according to another example embodiment.

FIG. 2C is another bottom view of the tactile input device 116 according to another example embodiment. As shown in FIG. 2C, the bottom 214 of the tactile input device 116 may include a stiffener 215. The stiffener 215 may include a rigid material, such as ribbed steel, that protects components of the tactile input device 116, such as a controller, and maintains a planar shape of the tactile input device 116.

Figure 3:
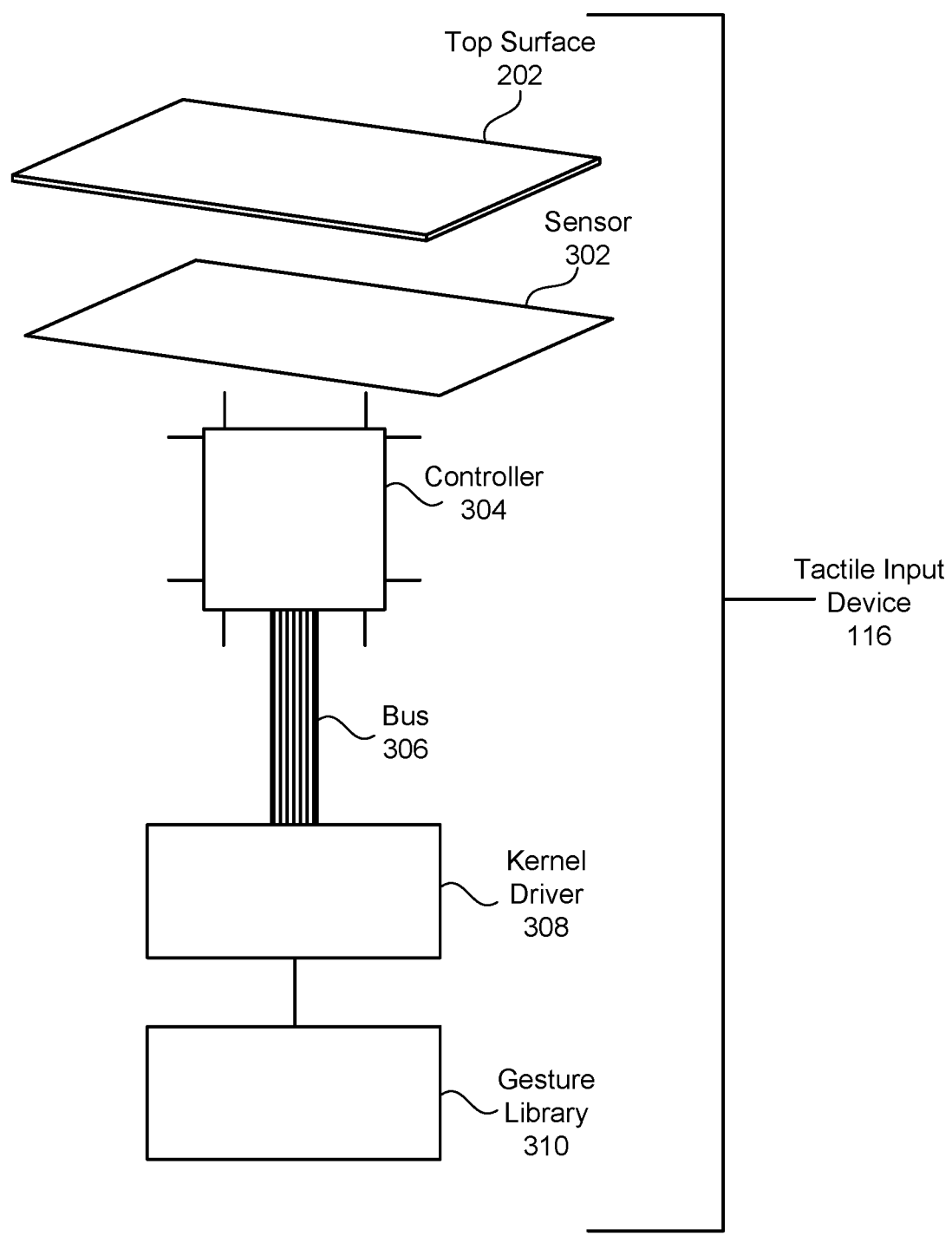
FIG. 3 is an exploded conceptual diagram of the tactile input device and related components according to an example embodiment.

FIG. 3 is an exploded conceptual diagram of the tactile input device 116 and related components according to an example embodiment. In this example, the tactile input device 116 includes the top surface 202, a sensor 302, a controller 304, a bus 306, a kernel driver 308, and a gesture library 310. Any combination of functions of the controller 304, bus 306, kernel driver 308, and/or gesture library 310 may be distributed into other components of the portable computing device 100, such as the processor of the portable computing device 100.

The surface 202 may be configured to be contacted by a user to actuate and trigger an electrical response within the portable computing device 100. The top surface 202 may, for example, be on top of the tactile input device 116 and above the sensor 302, and/or form a top of the tactile input device 116, parallel and flush or nearly flush with other components of the portable computing device 100 (shown in FIG. 1), such as the top 105 of the chassis 106 and/or palm rest areas 114A, 114B. The top surface 202 may be made of a rigid material, such as glass, plastic, or ceramic, and may be planar, such as a planar glass surface and/or a planar plastic surface. The top surface 202 surface may be operably coupled to the sensor 302. The sensor 302 can be activated when a user enters an input (e.g., a touch, swipe, or a click), such as by applying pressure, on the top surface 202 of the tactile input device 116, and can communicate electronic signals within the portable computing device 100. The sensor 302 can be, for example, a flame-retardant class-4 (FR4) printed circuit board, and may include a capacitive grid. The sensor 302 may be responsive to applications of pressure on the top surface 202 and/or sensor 302, and may provide signals to a controller 304 indicating changes in resistance and/or capacitance in the sensor 302 based on the applications of pressure.

The controller 304 may be operably coupled to the sensor 302. Controller 304 may be an embedded microcontroller chip and may include, for example, read-only firmware. The controller 304 may include a single integrated circuit containing a processor core, memory, and programmable input/output peripherals. The controller 304 may be embodied and/or included in a printed circuit board (PCB). The bus 306 may be a PS/2, I2C, SPI, WSB, or other bus. The bus 306 may be operably coupled to the controller 304 and may communicate with the kernel driver 308. The kernel driver 308 may include firmware and may also include and/or communicate with the gesture library 310. The gesture library 310 may include executable code, data types, functions, and other files (such as JAVASCRIPT files) which may be used to process input to the tactile input device 116 (such as directional gestures, clicks, taps, or drags). The gesture library 310, in combination with the kernel driver 308, bus 306, controller 304, sensor 302, and top surface 202, may process various touch inputs to recognize gestures.

The components of the tactile input device 116, and their interrelationships, as shown and described with respect to FIG. 3, are merely an example. Functionalities of the gesture library 310 may be performed by the kernel driver 308 and/or controller 304, an operating system, or an application. The functionalities may, for example, be stored and/or included on a non-transitory computer-readable storage medium comprising instructions stored thereon that, when executed by a processor of the portable computing device 100 or the controller 304, are configured to cause the computing device 100 to process touch inputs and recognize gestures. Or, the tactile controller 304, bus 306, kernel driver 308, and/or gesture library 310, may be designed as an application specific integrated circuit (ASIC) to process touch inputs and recognize gestures.

Figure 4A:
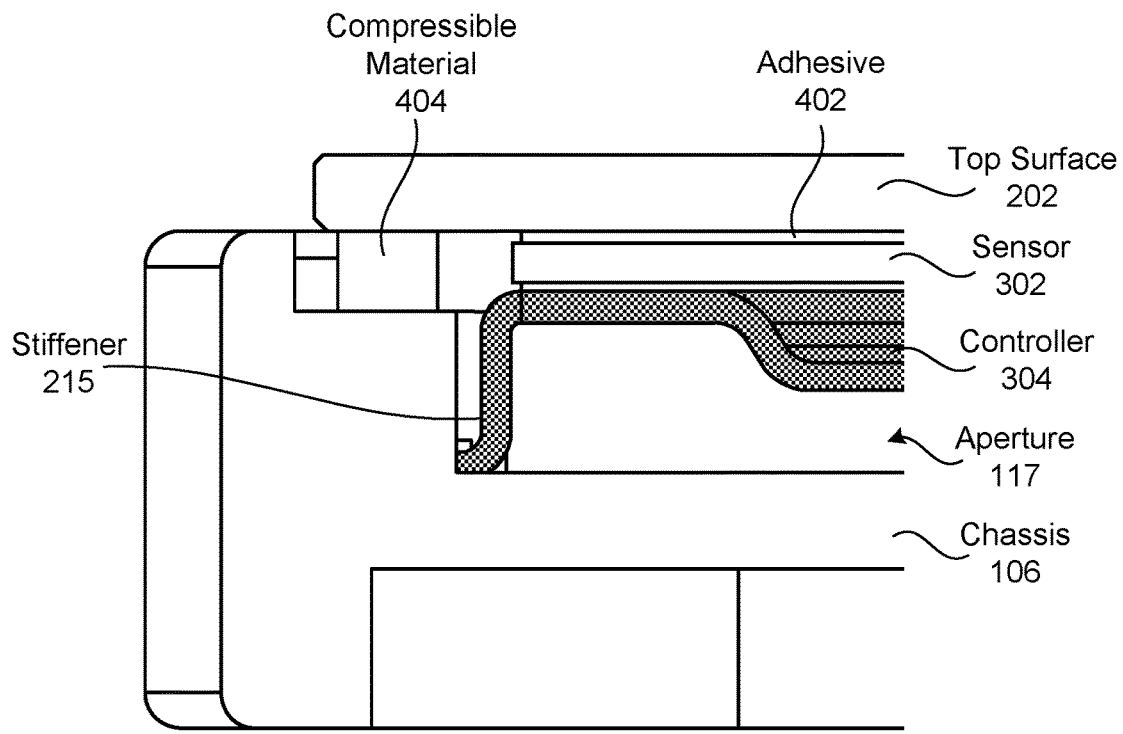
FIG. 4A is a cross-sectional side view of the portable computing device including the tactile input device according to an example embodiment.

FIG. 4A is a cross-sectional side view of the portable computing device 100 including the tactile input device 116 according to an example embodiment. The tactile input device 116 may include an adhesive 402, such as glue, interposed between the top surface 202 and the sensor 302. The adhesive 402 may secure the top surface 202 to the sensor 302. The controller 304 may be adjacent to, and/or below, the sensor 302, on an opposite side of the sensor from the adhesive 342 and/or top surface 202. The stiffener 215 may rest under the controller 304 in the tactile input device aperture 117 defined by the chassis 106, and may hold the tactile input device 116 up to keep the top surface 202 flush or nearly flush with the top 105 and/or top portion of the chassis 106. A compressible material 404, such as compressible foam or rubber, between the top surface 202 and the chassis 106 where the top surface 202 extends beyond the sensor 302, may protect the top surface 202 from damage.

Figure 4B:
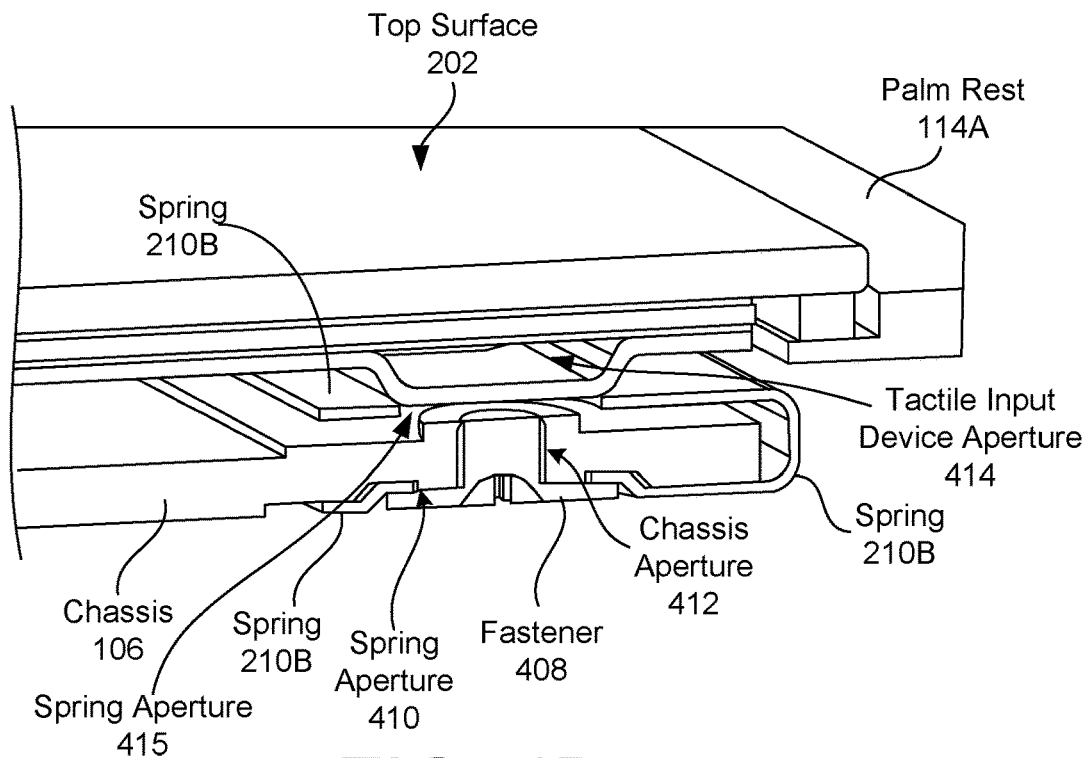
FIG. 4B is a cross-sectional top perspective view of the portable computing device including the tactile input device according to an example embodiment.

FIG. 4B is a cross-sectional top perspective view of the portable computing device 100 including the tactile input device 116 according to an example embodiment. As shown in FIG. 4B, the spring 210B may surround a portion of the chassis 106. A fastener 408, such as a screw or a bolt, may extend through a spring aperture 410 of the spring 210B and a chassis aperture 412 of the chassis 106, securing the spring 210B to the chassis 106. A spring aperture 415 of the spring 210B may be configured to receive another fastener.

Figure 4C:
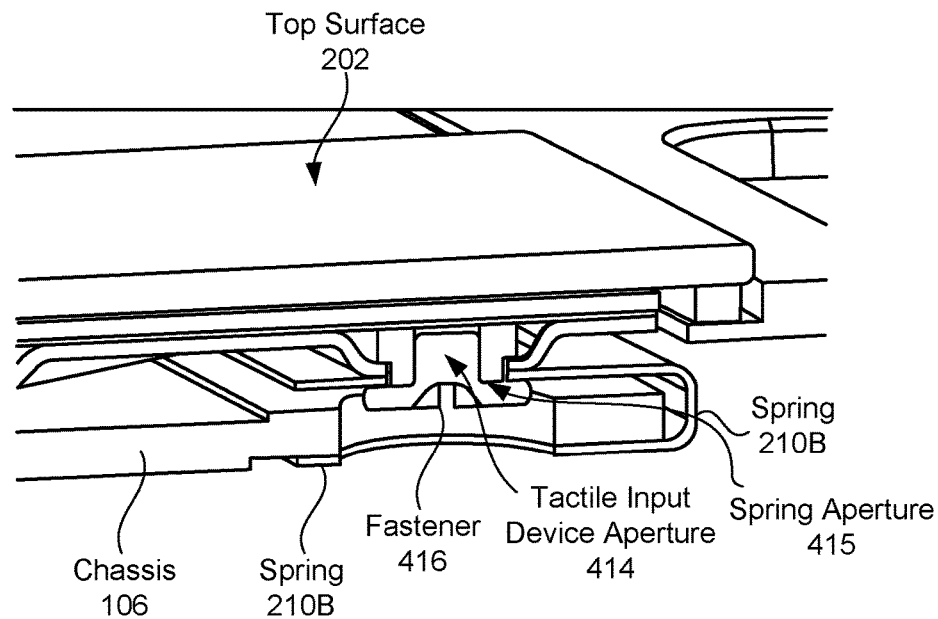
FIG. 4C is another cross-sectional top perspective view of the portable computing device including the tactile input device according to an example embodiment.

FIG. 4C is another cross-sectional top perspective view of the portable computing device 100 including the tactile input device 116 according to an example embodiment. As shown in FIG. 4C, a fastener 416, such as a screw or a bolt, may extend through the spring aperture 415 of the spring 210B and through the tactile input device aperture 117, securing the spring 210B to the tactile input device 116. The fastener 408 shown in FIG. 4B and the fastener 416 shown in FIG. 4C may secure the tactile input device 116 t the chassis 106, with the spring 210B biasing the tactile input device 116 to a distance (shown as a gap 506 in FIG. 5B) away from the chassis 106. The spring 210A (shown in FIG. 2B) may have similar features and functionalities as the spring 210B.

Figure 5A:
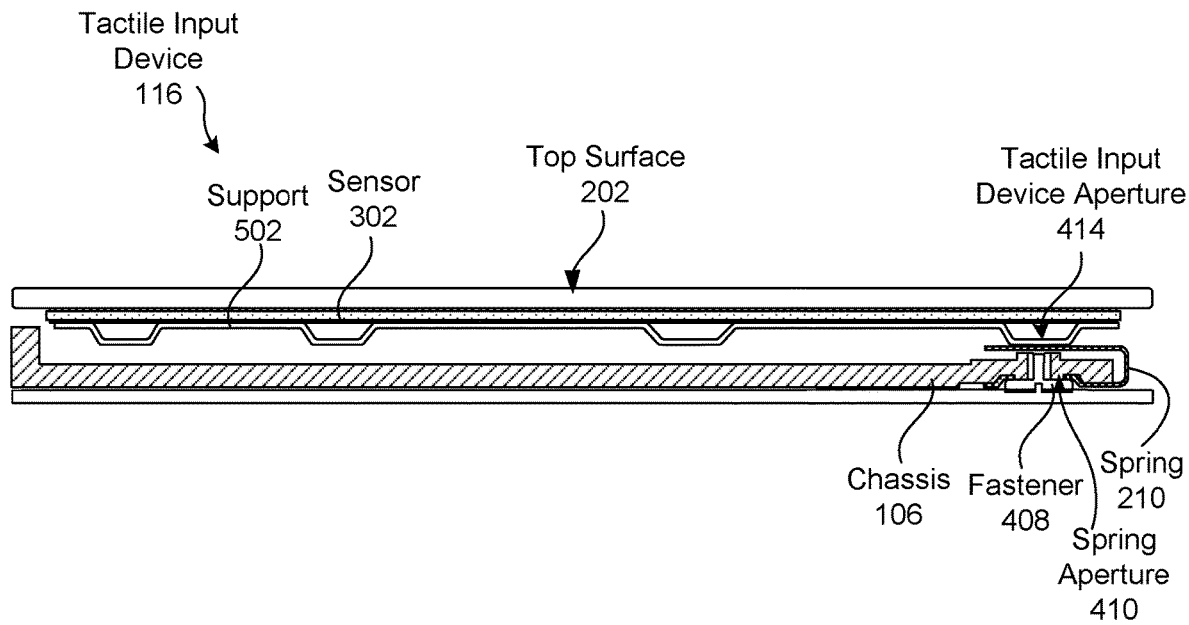
FIG. 5A is a cross-sectional side view of the tactile input device according to an example embodiment.

FIG. 5A is a cross-sectional side view of the tactile input device 116 according to an example embodiment. As shown in FIG. 5A, the fastener 408 may extend through the spring aperture 410 and through the chassis aperture 412, securing the chassis 106 to a spring 210 (which may represent either of the springs 210A, 210B).

Figure 5B:
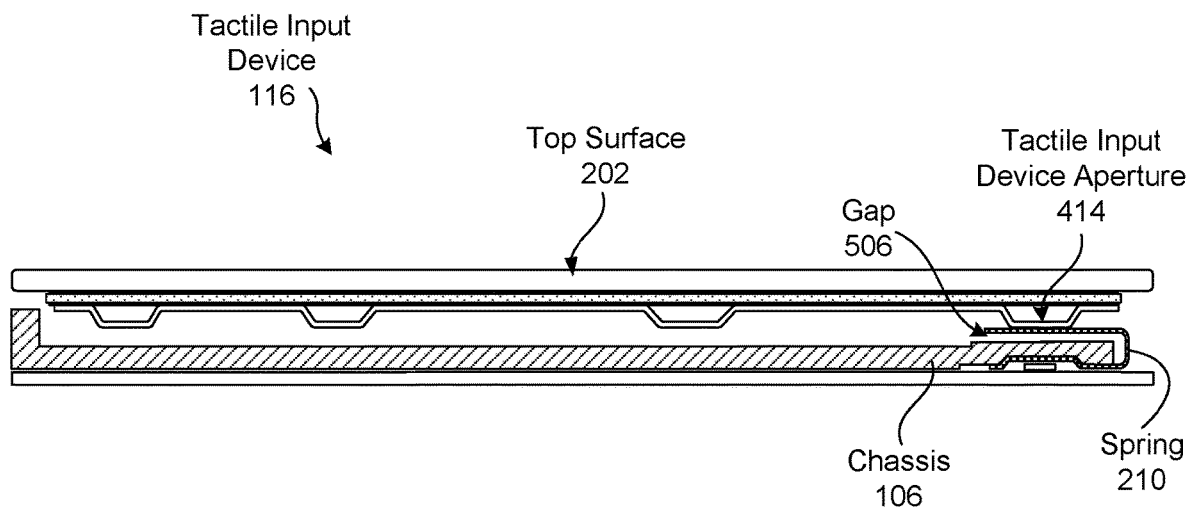
FIG. 5B is another cross-sectional side view of the tactile input device according to an example embodiment.

FIG. 5B is another cross-sectional side view of the tactile input device 116 according to an example embodiment. As shown in FIG. 5B, the bias spring 210 may create a gap 506 between the tactile input device 116 and the chassis 106, creating room for the tactile input device 116 to move down in response to downward pressure from the user on the top surface 202.

Figure 5C:
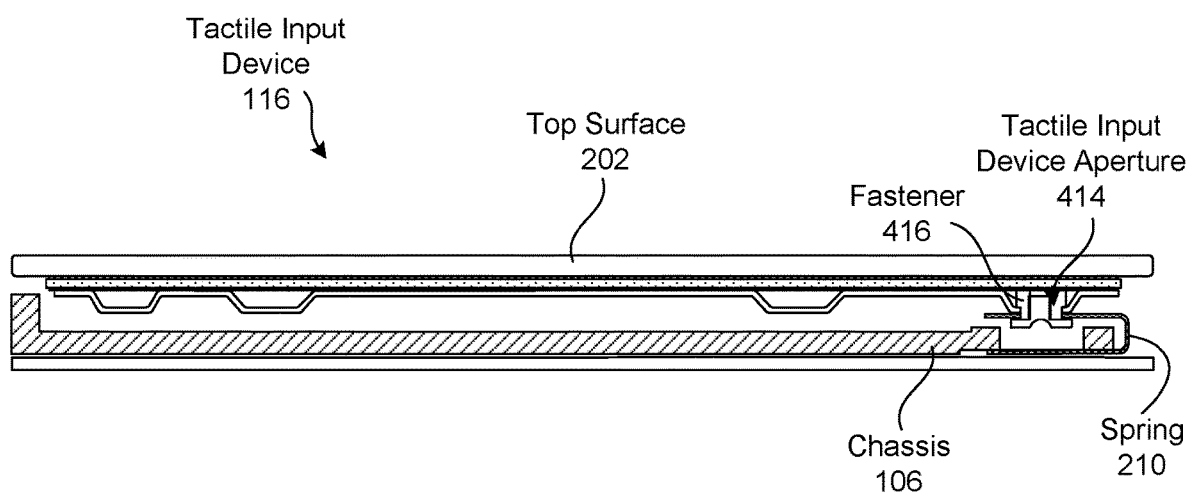
FIG. 5C is another cross-sectional side view of the tactile input device according to an example embodiment.

FIG. 5C is another cross-sectional side view of the tactile input device 116 according to an example embodiment. As shown in FIG. 5C, the fastener 416 may extend through the tactile input device aperture 117 and the spring aperture 415 to secure the tactile input device 116 to the spring 210.

Figure 6A:
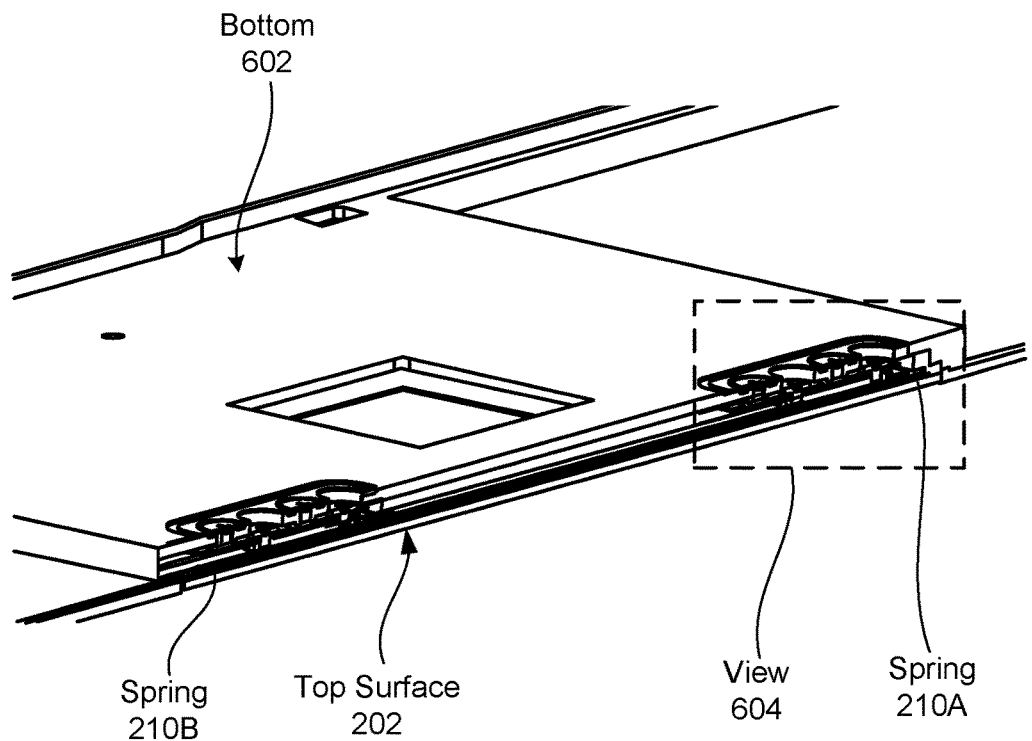
FIG. 6A is a cross-sectional bottom perspective view of the portable computing device including the tactile input device according to an example embodiment.

FIG. 6A is a cross-sectional bottom perspective view of the portable computing device 100 including the tactile input device 116 according to an example embodiment. As shown in FIG. 6A, springs 210A, 210B may secure the tactile input device 116 to the chassis 106. An expanded view 604 of a portion of FIG. 6A is shown in FIG. 6B.

Figure 6B:
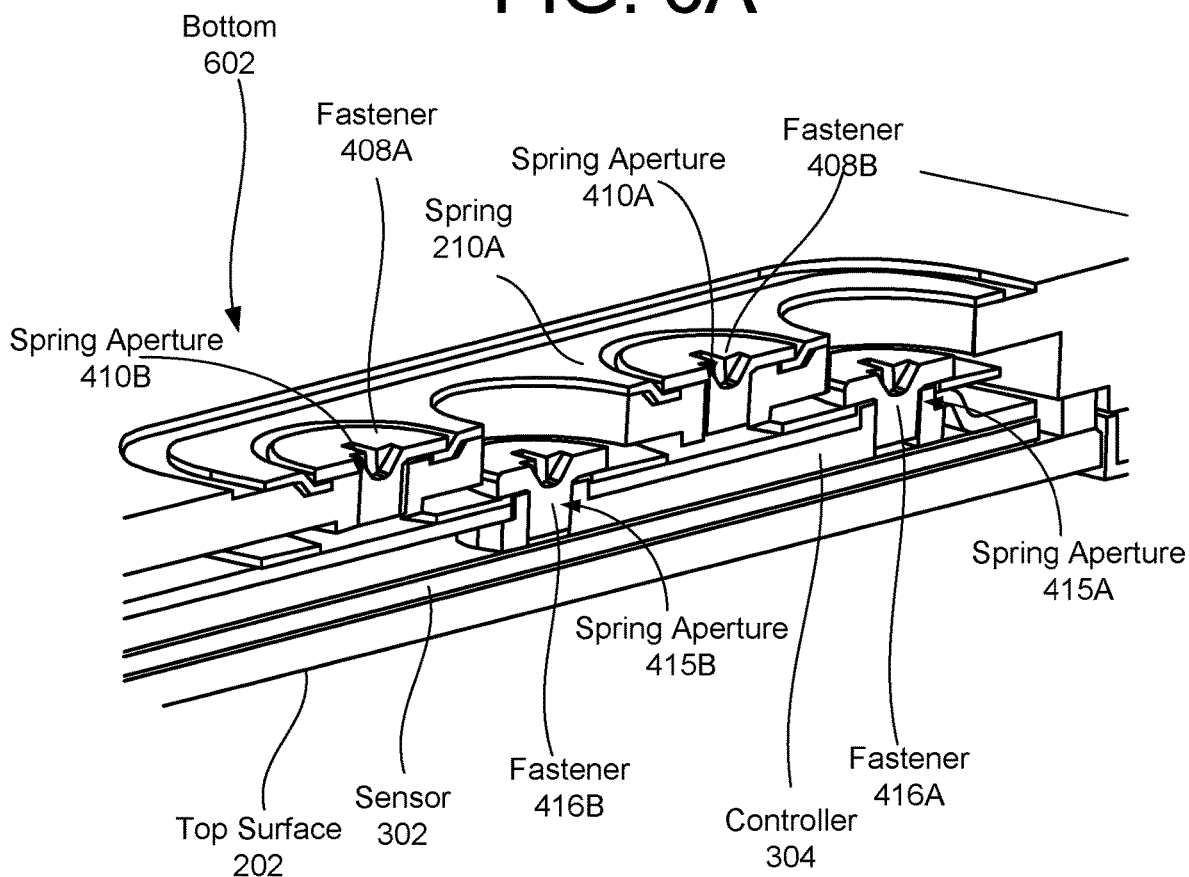
FIG. 6B is an expanded view of a portion of the portable computing device and the tactile input device according to an example embodiment.

FIG. 6B is an expanded view of a portion of the portable computing device 100 and the tactile input device 116 according to an example embodiment. FIG. 6B shows the portion of the portable computing device 100 included in the view 604 rectangle of FIG. 6A. Spring apertures 410A, 410B may be examples of the spring aperture 410 described above, and spring apertures 415A, 415B may be examples of the spring aperture 415 described above. The spring apertures 410A, 410B may be staggered from the spring apertures 415A, 415B, allowing the fasteners 408A, 408B, 416A, 416B (which may be examples of the fasteners 408, 416) to have staggered heights and achieve a thinner form factor from the bottom 602 of the chassis 106 of the base 104 of the portable computing device 100 to the top surface 202 of the tactile input device 116. The spring apertures 410A, 410B and fasteners 408A, 408B may be located farther down, and/or closer to the bottom 602, than the spring apertures 415A, 415B and the fasteners 416A, 416B, and/or the spring apertures 415A, 415B and the fasteners 416A, 416B may be located farther up, and/or closer to the top surface 202, than the spring apertures 410A, 410B and the fasteners 408A, 408B.

Figure 7A:
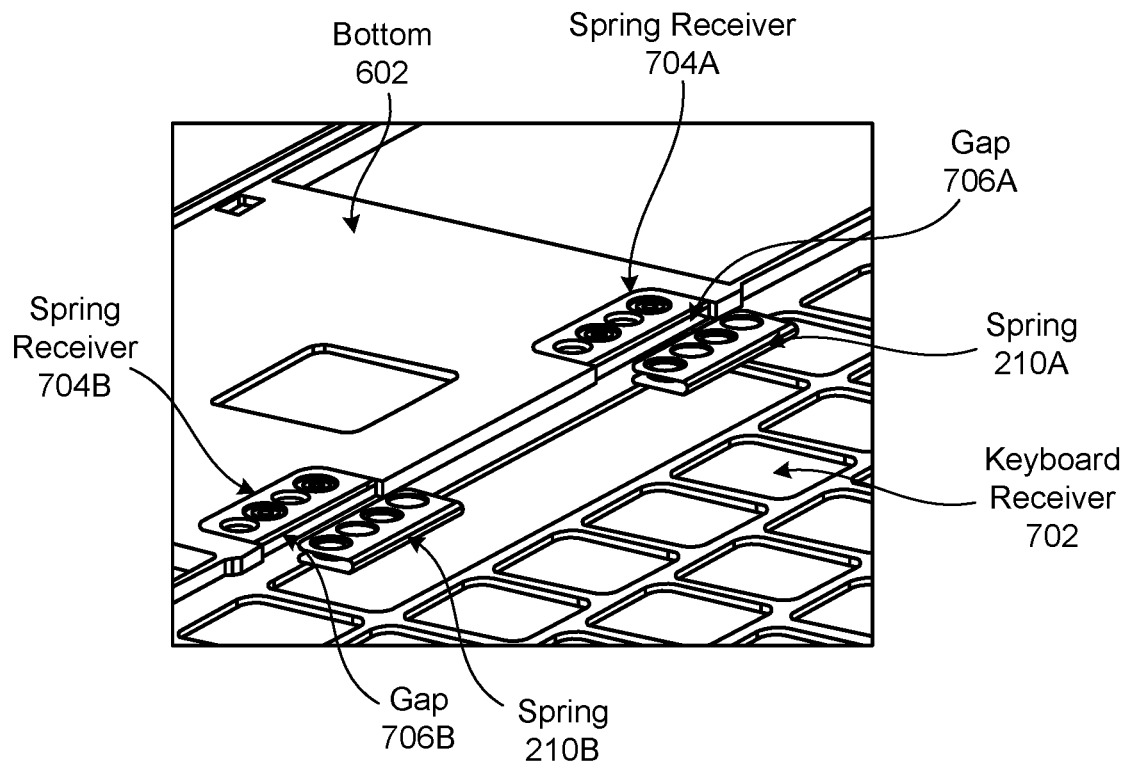
FIG. 7A is a perspective bottom view showing springs being installed onto a chassis of the portable computing device according to an example embodiment.

FIG. 7A is a perspective bottom view showing springs 210A, 210B being installed onto the chassis 106 of the portable computing device 100 according to an example embodiment. As shown in FIG. 7A, a keyboard receiver 702, with apertures for the keys of the keyboard 108, may be connected to the chassis 106. Gaps 706A, 706B may be defined between spring receivers 704A, 704B of the chassis 106 and the keyboard receiver 702. The gaps 706A, 706B may enable an assembler of the portable computing device 100 to slide the springs 210A, 210B around the spring receivers 704A, 704B of the chassis 106.

Figure 7B:
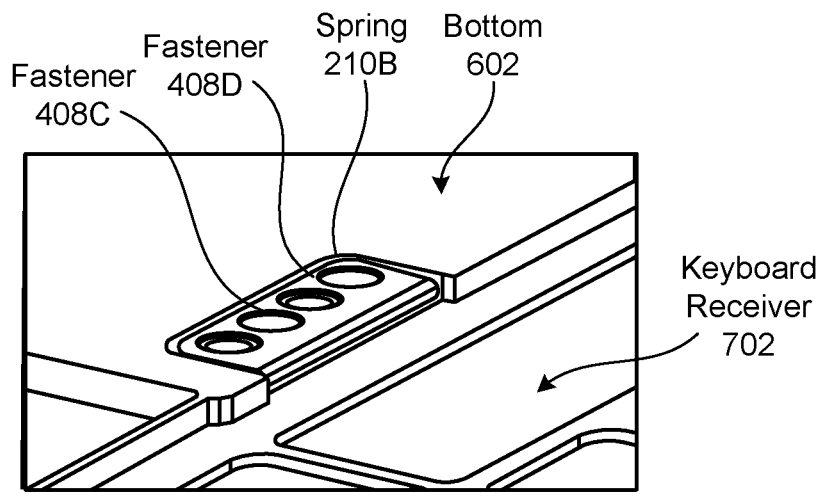
FIG. 7B is a perspective bottom view showing fasteners attach one of the springs to the chassis according to an example embodiment.

FIG. 7B is a perspective bottom view showing fasteners 408C, 408D attach one of the springs 210B to the chassis 106 according to an example embodiment. The fasteners 408C, 408D may have similar features to the fasteners 408, 408A, 408B described above. The assembler of the portable computing device 100 may twist and/or insert the fasteners 408C, 408D, which may be threaded, through the spring apertures 410A, 410B (not labeled in FIG. 7B) and chassis apertures 412 (not labeled in FIG. 7B), which may also be threaded.

Figure 7C:
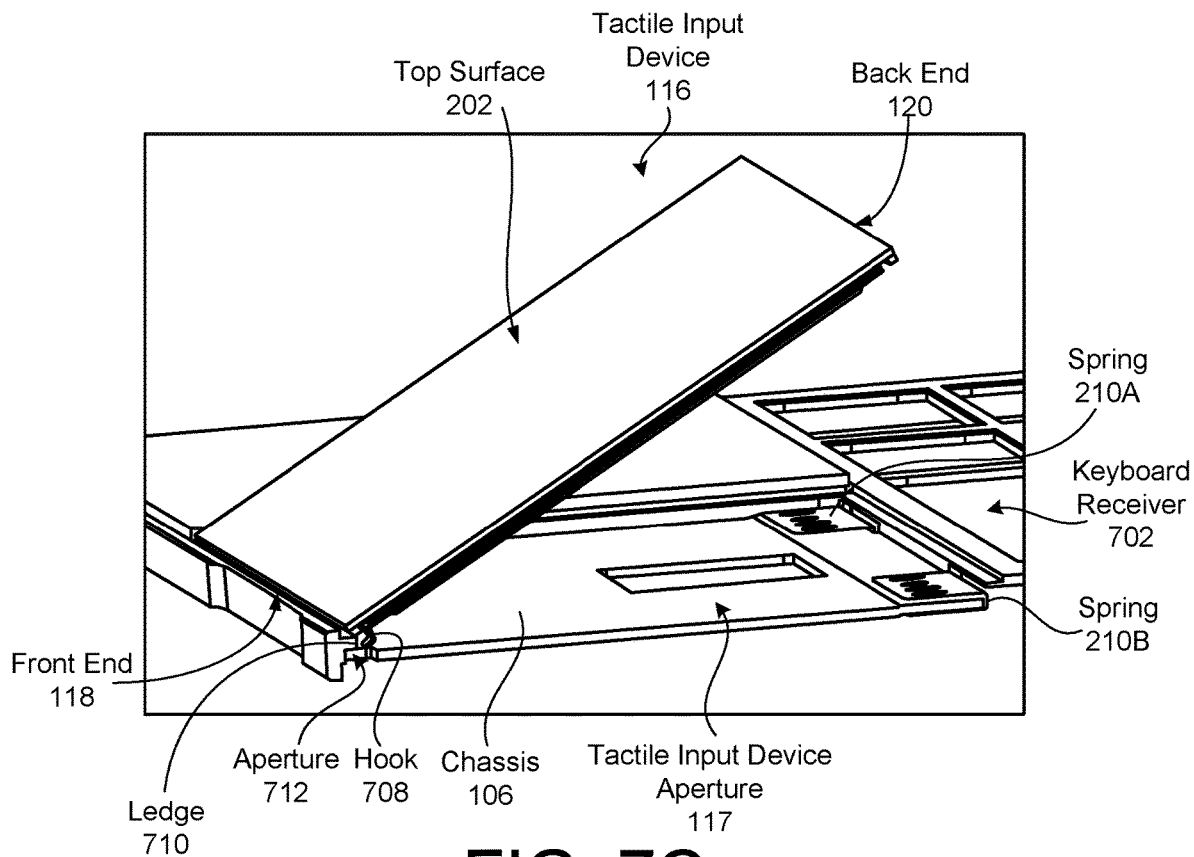
FIG. 7C is a top perspective view showing a front end of the tactile input device secured onto the chassis according to an example embodiment.

FIG. 7C is a top perspective view showing a front end 118 of the tactile input device 116 secured onto the chassis 106 according to an example embodiment. In this example, a hook 708 of the tactile input device 116 may be inserted into an aperture 712 defined by a ledge 710 of the chassis 106. In an example, the ledge 710 may be inserted into an aperture defined by the hook 708. While a hook 708 is shown in FIG. 7C, the tactile input device 116 may include any securement mechanism, such as a latch or pin. The hook 708 and/or a securement mechanism of the tactile input device 116 may be superposed by the top surface 202, and/or may not extend beyond the top surface 202. After the front end 118 of the tactile input device 116 has been secured to the chassis 106, the back end 120 of the tactile input device 116 may be secured to the chassis 106 via the springs 210A, 210B.

Figure 7D:
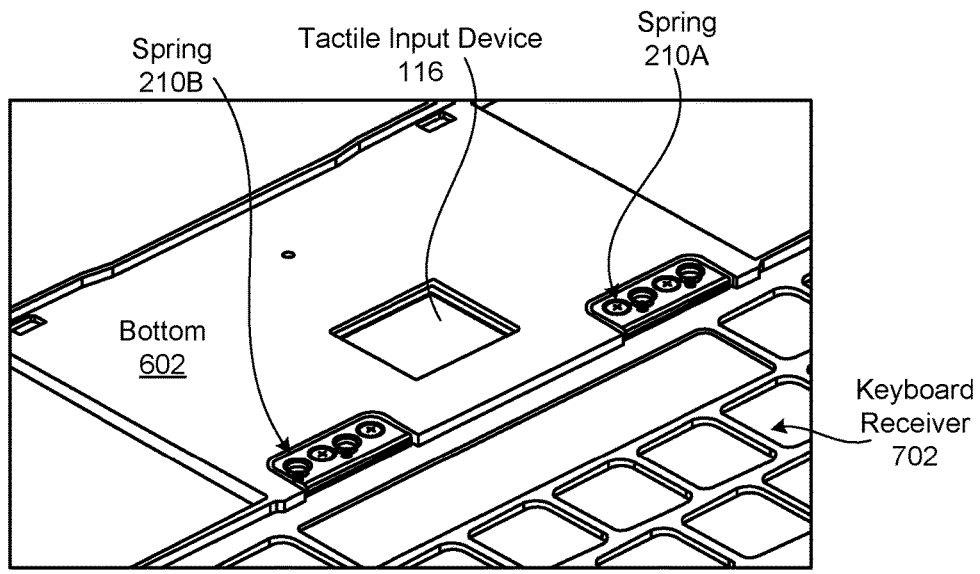
FIG. 7D is a bottom perspective view in which fasteners have attached the springs to the tactile input device according to an example embodiment.

FIG. 7D is a bottom perspective view in which fasteners (not shown in FIG. 7D) have attached the springs 210A, 210B to the tactile input device 116 according to an example embodiment. In this example, the assembler may attach the fasteners 416A, 416B to the springs 210A, 210B and the tactile input device 116 from below the portable computing device 100 and/or through the bottom 602 of the chassis 106. By inserting the tactile input device 116 into the portable computing device by securing the securement mechanism (such as the hook 708) to the chassis and then attaching the fasteners 416A, 416B to the springs 210A, 210B and the tactile input device 116, the tactile input device 116 may have been installed into the portable computing device 100 without the tactile input device passing through a plane extending along the bottom 602 and/or bottom portion of the chassis 106.

Figure 8:
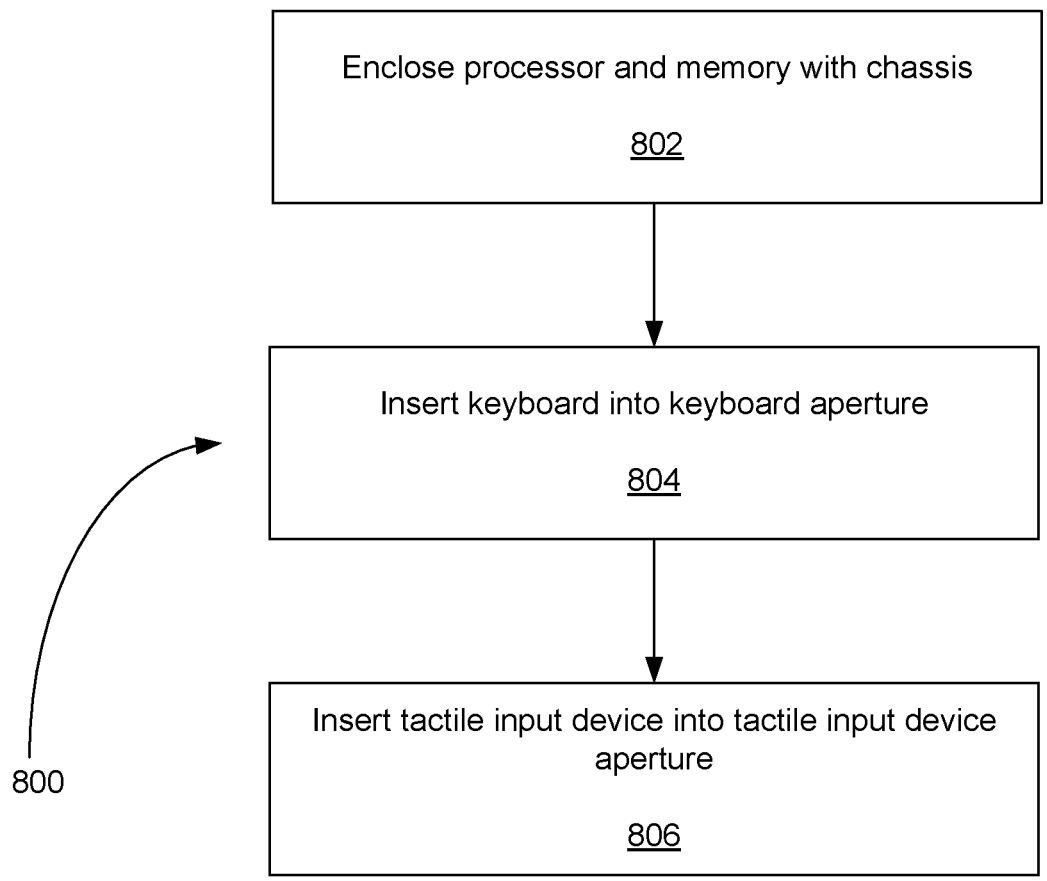
FIG. 8 is a flowchart showing a method of manufacturing the portable computing device according to an example embodiment.

FIG. 8 is a flowchart showing a method 800 of manufacturing the portable computing device 100 according to an example embodiment. According to this example, the method 800 may include enclosing at least one processor and at least one memory device with a chassis 106 (802). The method 800 may also include inserting a keyboard 108 into a keyboard aperture 110 defined by a top portion 105 of the chassis 106 (804). The method 800 may also include inserting a tactile input device 116 into a tactile input device aperture 117 defined by the top portion 105 of the chassis 106 without the tactile input device 116 passing through a plane extending along a bottom portion 602 of the chassis 106 (806). The bottom portion 602 of the chassis 106 being opposite from the top portion 105 of the chassis 106. The plane may be parallel to a top surface 202 of the tactile input device 116.

According to an example, the inserting the tactile input device 116 into the tactile input device aperture 117 (806) may include inserting a hook 708 of the tactile input device 116 underneath a ledge 710 extending into the tactile input device aperture 117. The hook 708 may be included on a front end portion 118 of the tactile input device 116. The inserting the tactile input device 116 into the tactile input device aperture 117 (806) may also include placing a back end portion 120 of the tactile input device 116 onto a spring 210. The spring 210 may be connected to the chassis 106. The spring 210 may be biased to push the back end portion 120 away from the chassis 106. The inserting the tactile input device 116 into the tactile input device aperture 117 (806) may also include fastening the back end portion 120 to the spring 210.

According to an example, the tactile input device may include a top surface 105, a sensor 302 beneath the top surface 202, a controller 304 beneath the top surface 202, and a securement mechanism (such as a hook 708). The controller 304 may be configured to process input received by the sensor 302. The sensor 302, the controller 304, and the securement mechanism may all be superposed by the top surface 202.

Figure 9:
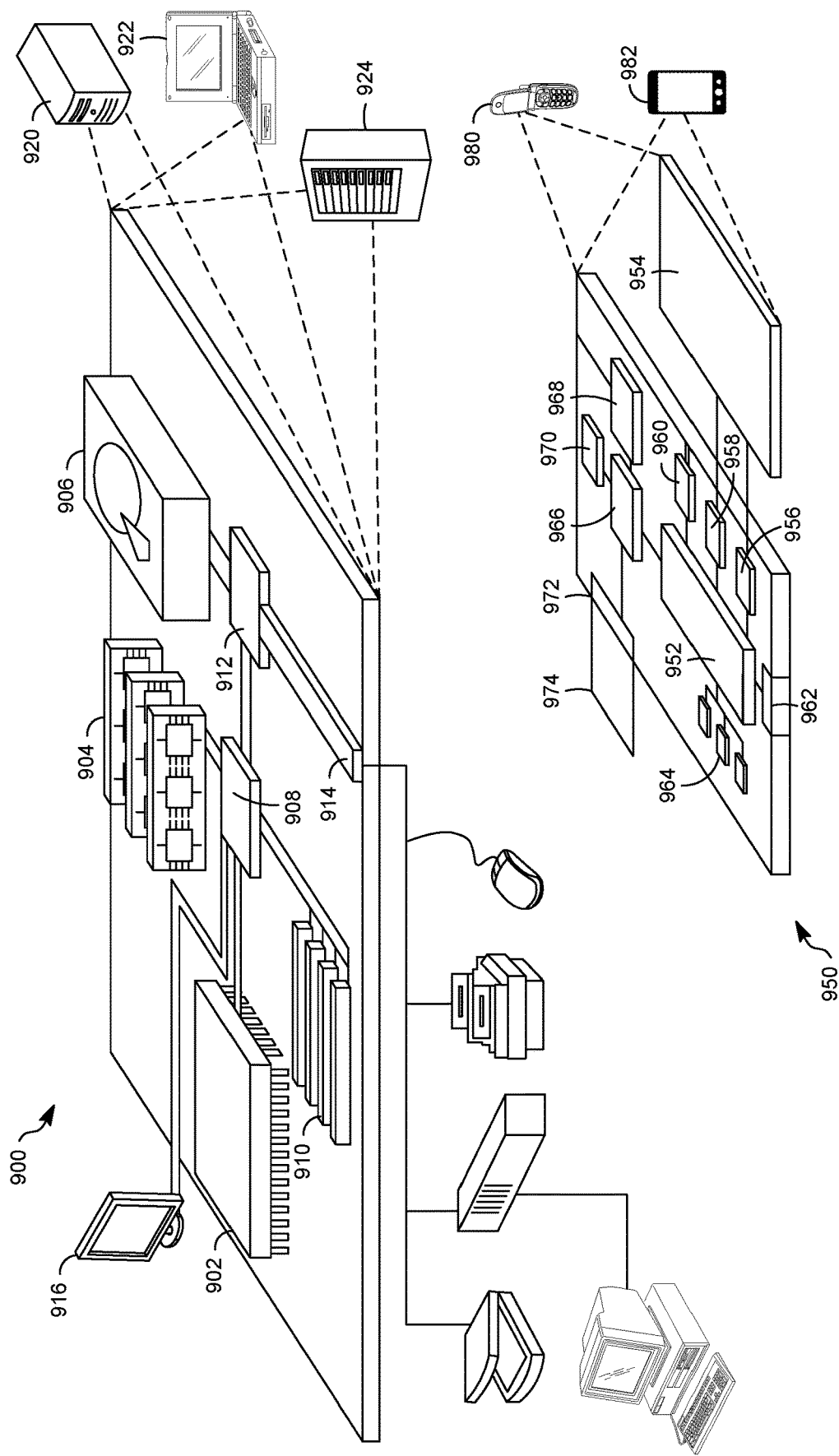
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A tactile input device comprising:
    a top surface;
    a sensor beneath the top surface;
    a controller beneath the top surface, the controller being configured to process input received by the sensor; and
    a hook configured to be inserted underneath a ledge extending into a tactile input device aperture, the tactile input device aperture being defined by a top portion of a chassis of a portable computing device, without the tactile input device passing through a plane extending along a bottom portion of the chassis, the bottom portion of the chassis being opposite from the top portion of the chassis, the plane being parallel to a top surface of the tactile input device,
    wherein the sensor, the controller, and the hook are all superposed by the top surface, the hook not extending beyond the top surface.

2. The tactile input device of claim 1, wherein the top surface includes a planar glass surface.

3. The tactile input device of claim 1, wherein the top surface includes a planar plastic surface.

4. The tactile input device of claim 1, wherein the top surface is rectangular.

5. The tactile input device of claim 1, wherein the sensor includes a capacitive grid.

6. The tactile input device of claim 1, wherein the controller includes a printed circuit board (PCB).

7. The tactile input device of claim 1, wherein all components of the tactile input device other than the top surface are superposed by the top surface.

8. A portable computing device comprising:
    at least one processor;
    a chassis enclosing the at least one processor, the chassis defining a keyboard aperture and a tactile input device aperture, the chassis including a ledge defining a ledge aperture;
    a keyboard in the keyboard aperture, the keyboard including multiple keys and being coupled to the at least one processor; and
    a tactile input device in the tactile input device aperture, the tactile input device being coupled to the at least one processor, the tactile input device comprising a top surface and a securement mechanism, the securement mechanism being inserted into the ledge aperture and not extending beyond the top surface, wherein a distance from a back end of the tactile input device to a key of the multiple keys that is closest to the tactile input device is less than one-tenth of a length of the tactile input device, the back end of the tactile input device being an end of the tactile input device that is closest to the keyboard and the length of the tactile input device being a distance from the back end of the tactile input device to an opposing front end of the tactile input device.

9. The portable computing device of claim 8, wherein the top surface of the tactile input device is rectangular.

10. The portable computing device of claim 8, wherein all securement mechanisms of the tactile input device other than a top surface of the tactile input device are superposed by the top surface of the tactile input device.

11. The portable computing device of claim 8, wherein the securement mechanism comprises a latch inserted into the ledge aperture and securing the tactile input device to the chassis.

12. The portable computing device of claim 8, wherein the securement mechanism comprises a hook inserted into the ledge aperture and securing the tactile input device to the chassis.

13. A portable computing device comprising:
at least one processor;
a chassis enclosing the at least one processor, the chassis defining a keyboard aperture and a tactile input device aperture, the chassis including a ledge defining a ledge aperture;
a keyboard in the keyboard aperture, the keyboard including multiple keys and being coupled to the at least one processor; and
a tactile input device in the tactile input device aperture, the tactile input device being coupled to the at least one processor, the tactile input device comprising a top surface and a securement mechanism, the securement mechanism being inserted into the ledge aperture and not extending beyond the top surface,
wherein a distance from a front end of the tactile input device to a front end of the portable computing device is less than one-twentieth of a length of the tactile input device, the front end of the tactile input device being an end of the tactile input device that is distal from the keyboard, the front end of the portable computing device being an end of the portable computing device that is adjacent to the front end of the tactile input device, the length of the tactile input device being a distance from the front end of the tactile input device to a back end of the tactile input device, the back end of the tactile input device being an end of the tactile input device that is adjacent to the keyboard.

14. The portable computing device of claim 13, wherein a top surface of the tactile input device is rectangular.

15. The portable computing device of claim 13, wherein all securement mechanisms of the tactile input device are superposed by a top surface of the tactile input device.

16. A method of manufacturing a portable computing device, the method comprising:
enclosing at least one processor and at least one memory device with a chassis;
inserting a keyboard into a keyboard aperture defined by a top portion of the chassis; and
inserting a hook of a tactile input device underneath a ledge extending into a tactile input device aperture defined by the top portion of the chassis without the tactile input device passing through a plane extending along a bottom portion of the chassis, the bottom portion of the chassis being opposite from the top portion of the chassis, the plane being parallel to a top surface of the tactile input device.

17. The method of claim 16, wherein the inserting the tactile input device into the tactile input device aperture further comprises:
placing an end portion of the tactile input device, opposite from the hook, onto a spring, the spring being connected to the chassis and biased to push the end portion away from the chassis; and
fastening the end portion to the spring.

18. The method of claim 16, wherein:
the tactile input device comprises:
a top surface;
a sensor beneath the top surface;
a controller beneath the top surface, the controller being configured to process input received by the sensor; and
a securement mechanism,
wherein the sensor, the controller, and the securement mechanism are all superposed by the top surface.

* * * * *